United States Patent [19]

Keyser et al.

[11] Patent Number: 4,620,909

[45] Date of Patent: Nov. 4, 1986

[54] METHOD FOR ISOTOPE REPLENISHMENT IN AN EXCHANGE LIQUID USED IN A LASER INDUCED ISOTOPE ENRICHMENT PROCESS

[76] Inventors: Graham M. Keyser, 1816 Will Scarlett Drive, Mississauga, Ontario, Canada, L5K 2K2; David L. Mader, 1294 Islington Avenue, Apt. #704, Islington, Ontario, Canada, M9A 3K2; James A. O'Neill, 111 Pacific Avenue, Apt. #604, Toronto, Ontario, Canada, M6P 2P2

[21] Appl. No.: 547,475

[22] Filed: Oct. 31, 1983

[51] Int. Cl.$^4$ ............................................. C07C 17/00
[52] U.S. Cl. .............................. 204/157.22; 252/631; 423/249
[58] Field of Search .................. 423/249; 252/631; 204/163 R

[56] References Cited

U.S. PATENT DOCUMENTS

| 3,549,323 | 12/1970 | Babcock | 423/648 A |
| 3,888,974 | 6/1975 | Stevens | 423/580 |
| 4,025,408 | 5/1977 | Marling | 204/163 R |
| 4,025,560 | 5/1977 | Rolston et al. | 423/580 |
| 4,101,645 | 7/1978 | Nitschke et al. | 423/648 A |
| 4,123,508 | 10/1978 | Mandrin | 423/580 |
| 4,221,774 | 9/1980 | Spevack | 423/580 |
| 4,257,860 | 3/1981 | Marling et al. | 204/162 R |

FOREIGN PATENT DOCUMENTS

| 0017020 | 3/1980 | European Pat. Off. |
| 2110690 | 12/1982 | United Kingdom |

Primary Examiner—Edward A. Miller
Attorney, Agent, or Firm—Ridout & Maybee

[57] ABSTRACT

A method is described and claimed for the replenishment of deuterium or tritium concentration in a laser isotope separation process for the production of $D_2O$, or for the recovery of tritium from contaminated $D_2O$ or $H_2O$. A working compound is selectively photodissociated by a laser beam and is replenished by contacting an exchange liquid in a countercurrent fashion in a first contacting column. The exchange liquid is replenished with isotope by in turn being contacted with a feed stream in a second contacting apparatus. This second contacting apparatus may be a gas/liquid or liquid/liquid contacting apparatus and the countercurrent flows therein may be about equal or unequal.

17 Claims, 3 Drawing Figures

METHOD FOR ISOTOPE REPLENISHMENT IN AN EXCHANGE LIQUID USED IN A LASER INDUCED ISOTOPE ENRICHMENT PROCESS

The present invention relates to a method for the replenishment of deuterium or tritium concentration in a laser isotope separation process for the production of heavy water ($D_2O$), or for the recovery of tritium (T) from contaminated $D_2O$ or $H_2O$ such as may come from a heavy water nuclear reactor, a tritium research facility or a fusion plant.

A presently used commercial process for the large scale production of $D_2O$ is the Girdler sulfide process which makes use of the temperature dependent exchange reaction between hydrogen sulfide and water as follows:

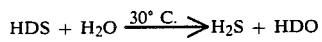

$$HDS + H_2O \xrightarrow{30°C} H_2S + HDO$$

By subjecting the feed water to a series of enrichment stages, this sulfide process can yield water having a deuterium content of 10–20%. Further enrichment to 99.8% deuterium is then achieved by fractional distillation of the enriched water.

The Girdler process requires approximately 40,000 moles of feed water to produce one mole of $D_2O$ and requires large volumes of $H_2S$ gas which is highly toxic and corrosive. Additionally, the Girdler process requires a large capital outlay to build an enrichment plant, and it is an energy intensive process which makes it less attractive as the cost of energy rises.

Recently, a new process for deuterium or tritium concentration has been developed which employs the selective photodissociation of a deuterium or tritium containing compound by means of a laser tuned to a specific wavelength. One such method is described in U.S. Pat. No. 4,257,860 issued Mar. 24, 1981 to Marling et al.

As an example of this process, gaseous trifluoromethane ($CHF_3$) having a natural abundance of deuterotrifluoromethane ($CDF_3$) of about 150 ppm may be irradiated by a pulsed beam from a carbon dioxide laser tuned to 10.2 μm to give the following reaction:

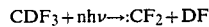

$$CDF_3 + nh\nu \rightarrow :CF_2 + DF$$

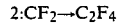

$$2:CF_2 \rightarrow C_2F_4$$

The dissociation of $CDF_3$ under these conditions is approximately 10,000 times more probable than the corresponding dissociation of $CHF_3$. Thus, this process yields a DF/HF mixture of about equal proportions, or in other words, upon conversion, this mixture gives water having about 50% deuterium content after a single enrichment stage. In contrast, the Girdler process gives water having a 20% deuterium content after 464 enrichment stages.

In addition to the superior enrichment factor available through the use of this laser induced dissociation process, the multihalogenated organic compounds which are preferred for employment in the process are volatile, non-explosive, non-corrosive and have low toxicity. The preferred working compound may be selected from the group consisting of a deuterated or tritiated analog of a dihalomethane, a trihalomethane, a 1,2-dihaloethylene, a trihaloethylene, a tetrahaloethane, and a pentahaloethane. The HF and DF produced is highly toxic and corrosive but it is present in small amounts relative to the overall quantities involved in the process, and it may be quickly converted into water. However, because of the high cost of building and operating a large high power $CO_2$ laser, this new process will only be economically attractive, as compared to the Girdler process, if savings can be achieved in other aspects of the process.

One problem confronting the commercialization of this laser process is the need to find an acceptable method for replenishing the deuterium concentration in the depleted working compound, i.e. the trifluoromethane or other compound which has been subjected to the laser photodissociation. Water is the ultimate source of deuterium in the overall process, and the working compound may be directly replenished with deuterium by undergoing an exchange reaction with water in the presence of a base catalyst. Probably because of the poor solubility of most suitable working compounds in water, the rate of this exchange reaction is generally unacceptably slow from a commercial standpoint.

A commercial process for this replenishment would involve the continuous countercurrent contacting in a suitable column of an aqueous exchange liquid and the working compound in the gas phase. Thus, the slower the reaction rate, the larger the gas/liquid contacting column must be, and the greater the volume of exchange liquid that is required. It has been found that by the addition to the exchange liquid of a suitable organic solvent which dissolves both the working gas and the water, the rate of the exchange reaction is enhanced thereby making this step commercially feasible.

A second problem facing the commercialization of this laser process is the need to find a suitable method for replenishing the isotope concentration in the depleted exchange liquid. A process involving fractional distillation of the exchange liquid mixture to remove the isotope depleted water followed by the addition of fresh water having a natural isotope concentration, is not feasible economically because of the large capital costs involved in dealing with the problem of precipitation of the base catalyst during such a distillation, and the high energy cost associated with this kind of a process. It has been found that these problems can be overcome and the exchange liquid may be isotopically replenished in a commercially feasible manner by contacting it with steam or water countercurrently in a contacting column or other contacting apparatus.

A second group of processes wherein the present invention may be used involve the removal of tritium from tritium-contaminated water from a heavy water nuclear reactor, tritium research facility, fusion plant, or fuel reprocessing plant. $D_2O$ used in heavy water reactors is subjected to neutron bombardment which over the course of a number of years generates an unacceptably high level of tritium contamination in the $D_2O$. Facilities which handle large quantities of tritium, such as tritium research facilities or fusion plants, will produce tritium contaminated light water either through accidental releases or tritium permeation of barriers during normal operations. Removal of the tritium contamination from either light or heavy water allows the recovery of a valuable product, tritium. In the case of contaminated water from a heavy water reactor, the decontamination process also allows the reuse of the valuable heavy water. In the case of contaminated light water from a tritium research facility, fusion plant or fuel reprocessing plant the decontamination of the light water will allow its discharge without violating legal limits on radioactive emissions.

As was the case with the deuterium concentration process, the selective laser dissociation reaction can be used to concentrate tritium from a feed stream. In this case, the feed stream is the contaminated water from a heavy water reactor, tritium research facility or fusion plant. When the contaminated water is $D_2O$, the exchange liquid comprises $D_2O$, optionally deuterated solvent and base catalyst; and the working compound such as $CTCl_3$ is mixed with its deuterated analog $CDCl_3$. When the contaminated water is $H_2O$, the exchange liquid comprises $H_2O$, optionally solvent and base catalyst; and the working compound such as $CTF_3$ is mixed with its protiated analog $CHF_3$.

The tritium depleted exchange liquid is countercurrently contacted with the feed stream of contaminated water in accordance with the method of the invention. Uncontaminated water is recovered from the exchange liquid by this method and exchange liquid having a replenished concentration of tritium is returned to the exchange column.

Accordingly, the present invention provides a method for isotope replenishment in a process for concentrating deuterium or tritium by means of a laser induced selective photodissociation of a deuterium or tritium containing working compound, mixed with its protiated or deuterated analog comprising the steps of:

contacting the isotope depleted working compound mixture countercurrently with an exchange liquid having approximately the isotope concentration of a feed stream of water or $D_2O$ in a first contacting column, the exchange liquid comprising a mixture of water or $D_2O$, optionally a water miscible organic solvent which enhances the rate of the isotope replenishment reaction, and a base catalyst;

removing isotope depleted exchange liquid from the bottom of the first column;

contacting the isotope depleted exchange liquid countercurrently with the feed stream in a second contacting apparatus;

removing the isotope replenished exchange liquid from one end of the second apparatus for use in the first column; and optionally recovering absorbed organic solvent from the gaseous water or $D_2O$ removed from the other end of the second apparatus.

The invention may be more clearly understood from the following detailed description wherein reference will be made to the drawings in which.

Figure 1:
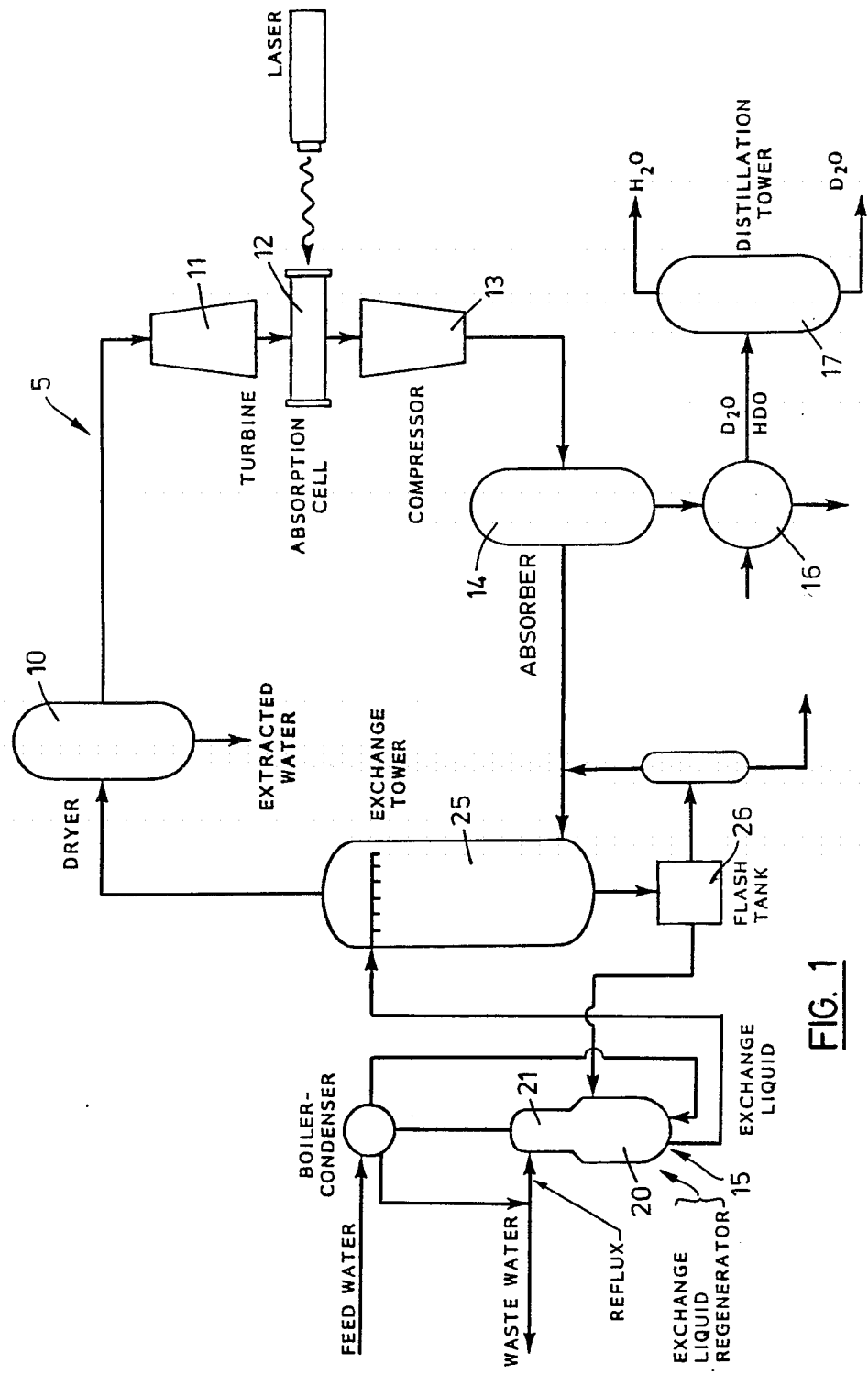
FIG. 1 is a schematic flow chart of the overall process.

The heavy water production plant diagrammatically shown in FIG. 1 comprises an isotope concentration loop 5 which includes a dryer 10, a turbine 11, an absorption cell 12, a compressor 13, and a DF/HF absorber 14; and a replenishment loop 15 which includes an exchange liquid regenerator 20 and a water enrichment unit 21. The isotope concentration loop 5 and the replenishment loop 15 meet at an exchange tower 25.

The natural concentration of deuterium in water is about 150 ppm. Trifluoromethane gas having a deuterium concentration approaching the natural abundance enters the absorption cell 12 via the turbine 11 at a pressure less than atmospheric. The gas is subjected to pulsed irradiation of 10.2 $\mu$m from a 2 to 10 MW carbon dioxide laser which results in the selective dissociation of deuterated trifluoromethane to give tetrafluoroethylene and deuterium fluoride (DF).

From the absorption cell 12, the gas flows through a compressor 13 into a DF/HF absorber 14 which may comprise a bed of NaF. The deuterium depleted trifluoromethane then flows to an exchange tower 25 where it undergoes a base catalyzed deuterium enrichment with an aqueous exchange liquid having an approximately natural deuterium abundance. The flow through the exchange tower 25 is in a countercurrent manner with the deuterium depleted trifluoromethane gas moving up the tower 25 and the exchange liquid moving down the tower 25. The enriched trifluoromethane emerging from the top of the tower 25 passes through a dryer 10 to remove humidity entrained from contacting the exchange liquid, and then the cycle is repeated.

Periodically, the DF/HF mixture is recovered from the absorber 14 and immediately converted to water in a reaction vessel 16 by one of several known means. The resulting water containing approximately 50% deuterium, is enriched by conventional fractional distillation in a column 17 to 99.8% $D_2O$.

In the exchange tower 25, it has been determined that the enrichment of the working gas, or more particularly trifluoromethane, occurs more readily when an organic co-solvent is used which organic solvent is miscible with water and in which the working gas is soluble. While there are a number of solvents that may be suitable as an organic co-solvent depending on the working gas and base catalyst used, it has been found that dimethylsulfoxide (DMSO) is a preferred organic solvent for use in the trifluoromethane system particularly described herein. DMSO is a solvent which is miscible with water and in which trifluoromethane is soluble.

While there are a large number of base catalysts which would perform satisfactorily in this water/DMSO solvent system, sodium hydroxide is preferred from an economic view point. It has been found that a satisfactory system for the enrichment of trifluoromethane comprises sodium hydroxide at a 0.01 to 0.1 mole/liter concentration in a DMSO/water mixture of 50 to 90 mole % DMSO.

When using this preferred exchange liquid, optimum isotope replenishment of the depleted trifluoromethane gas can be achieved in a gas/liquid contacting tower 25 having an internal packing or structure giving about four theoretical plates or stages, when the process temperature is about 50° to 80° C. and the pressure in the tower 25 is about 5 to 10 atmospheres.

Under these preferred conditions, trifluoromethane entering the bottom of the tower 25 having a deuterium content of about 20 ppm will exit the top of the tower 25 having a deuterium content of about 190 ppm. Likewise, water entering the top of the tower 25 having a deuterium content of 145 ppm will leave the bottom of the tower 25 having a deuterium content of about 20 ppm.

The replenishment loop 15 is concerned with replenishing the deuterium concentration to near natural abundance in the isotope depleted exchange liquid taken from the bottom of the tower 25. A conventional approach may be to subject the water/DMSO/base mixture comprising the exchange liquid to fractional distillation in order to remove the water, and then to simply replace it with fresh water having a natural concentration of deuterium. However, this approach is energy intensive and is complicated by the precipitation of sodium hydroxide, or other base, which would occur under these distillation conditions.

Figure 2:
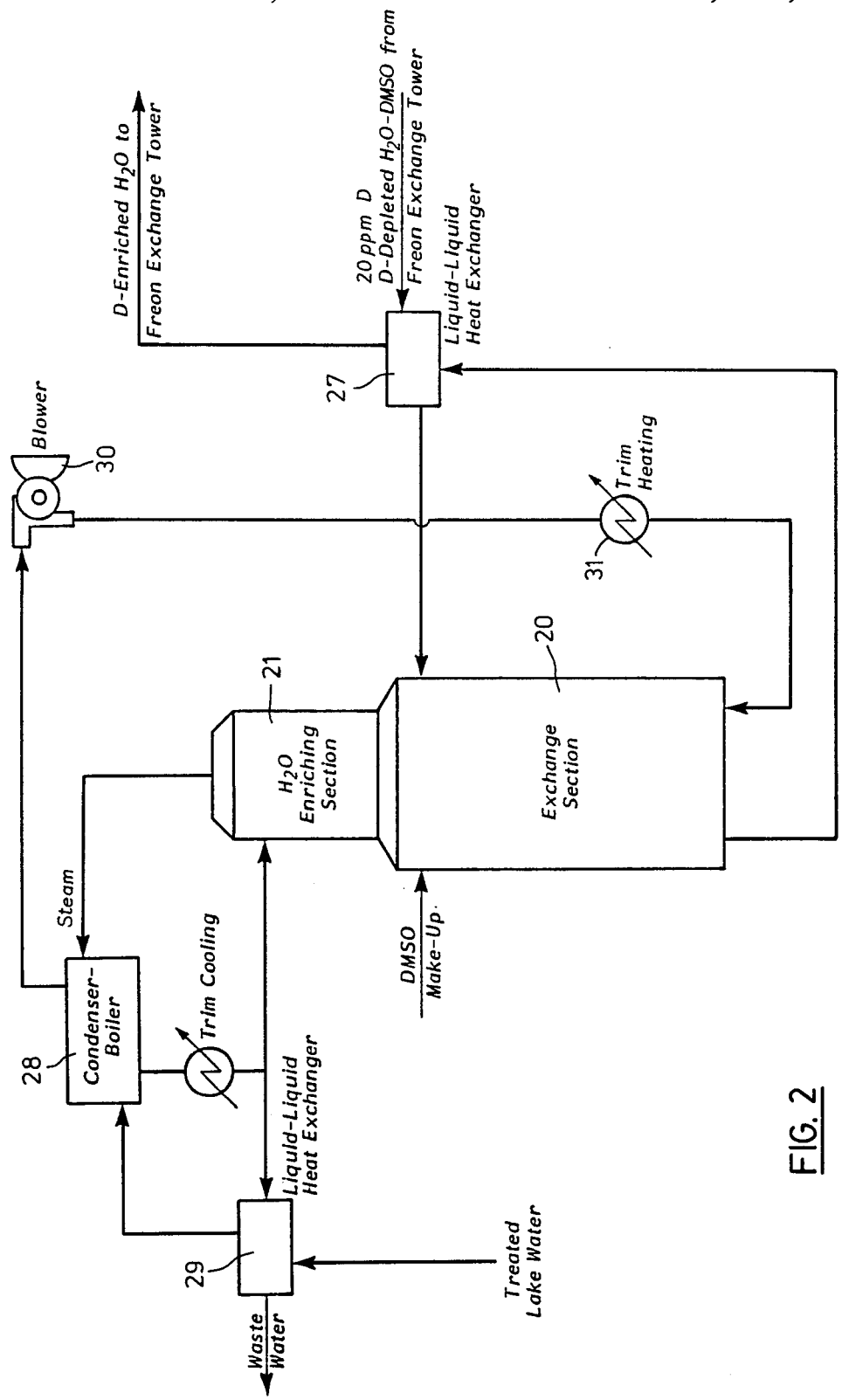
FIG. 2 is a schematic flow chart of the replenishment process for the exchange liquid.

In accordance with the present invention, the replenishment loop 15 shown in FIGS. 1 and 2 comprises an exchange liquid regenerator 20 which receives the deuterium depleted water/DMSO/base mixture from the exchange tower 25 after the mixture has passed through a flash tank 26 to recover dissolved trifluoromethane and the photolysis reaction product tetrafluoroethylene. As shown in FIG. 2, energy is conserved by passing the exchange liquid through a liquid-liquid heat exchanger 27 before it enters the top of the regenerator 20.

The regenerator 20 is a gas/liquid or liquid/liquid contacting apparatus which is provided with an internal packing or other structure so as to give a suitable number of theoretical plates for the exchange process. Although there are a number of variables which affect the number of theoretical plates needed to optimize the exchange process in the regenerator 20, 12 theoretical plates are generally considered to be sufficient when replenishing deuterium in the exchange liquid comprising the water/DMSO/base mixture described above.

In practice, when using a gas/liquid regenerator 20 having a plurality of sieve trays to effect a countercurrent contacting between a downward flow of exchange liquid and an approximately equal upward flow of steam, about 16 or 17 sieve trays are required to give the necessary 12 theoretical plates calculated.

As with the case of the exchange tower 25, the regenerator operates by providing an environment in which deuterium rich steam can come into contact with depleted exchange liquid so that equilibration of the isotope concentrations of the two phases can occur. By contacting the two phases countercurrently in a column having sufficient theoretical plates, the depleted liquid will become replenished to a near natural deuterium concentration as it moves down the regenerator column 20, and likewise the steam will gradually become depleted of its deuterium concentration as it moves up the column 20.

Using the water/DMSO/base exchange liquid described above, this method for replenishing the deuterium concentration of the exchange liquid avoids the problems aforementioned associated with a conventional distillation approach to exchange liquid replenishment. There is no problem with base salting out in the regenerator 20, and the replenishment process may be made energy efficient by using the heat of the waste steam taken from the top of the enriching unit 21 to produce more steam from the feed water.

As the steam percolates up the regenerator column 20, it absorbs a small amount of DMSO from the exchange liquid. Prior to discharging the waste steam into the environment, it is subjected to a conventional fractionation in an enrichment column 21 having about 4 theoretical plates. The DMSO recovered from the steam flows down the column 21 directly into the regenerator 20 where it mixes with the exchange liquid moving down that column.

Waste steam exiting the top of the enrichment column 21 has an acceptably low concentration of DMSO (about 200 ppm) and proceeds to a condenser/boiler 28 where it is used to boil feed water for use as steam in the regenerator 20. The waste water condensed in the condenser/boiler 28 will be at a temperature of about 90° C., and after diverting a small portion of it back to the top of the enrichment column 21 as reflux, it proceeds to a liquid-liquid heat exchanger 29 for the purpose of warming the feed water moving to the boiler 28. From the heat exchanger 29 the waste water is discarded.

The condenser/boiler 28 is connected to a blower 30 where the feed steam is compressed preparatory to its introduction into the regenerator column 20. Steam entering the blower 30 will have a temperature of about 90° C. and after compression in the blower 30 the steam will be at about 130° C. Any additional heating needed for the feed steam prior to its introduction into the regenerator 20 can be accomplished by a trim heater 31.

Thus, it will be appreciated by those skilled in the art that the use of the condenser/boiler 28 to recapture a significant portion of the heat energy of the waste steam results in a significant saving in the cost of energy needed for this portion of the overall process.

The principles of the present method for wet regeneration of an exchange liquid are also applicable to a tritium removal process such as the removal of tritium from contaminated heavy water or $H_2O$. The accumulated tritium is removed by means of a selective dissociation of a suitable working compound. Using a working compound analogous to that preferred for the $D_2O$ production process, calculations indicate that $CTF_3$ would be a suitable working compound for removing tritium from contaminated $H_2O$, and $CTCl_3$ would be suitable for cleaning up $D_2O$. Selective dissociation of the tritiated working compound would again be accomplished by means of a tuned high power laser beam, and the tritiated compounds formed in the dissociation reaction would most likely be converted to $T_2$ gas for storage in a metal sponge.

In a process for tritium removal from $H_2O$, almost all the tritium must be removed before the water coming off the top of the regenerator 20 can be discharged into the environment. Consequently, the performance requirements for the regenerator 20 used in this application are much more stringent than is the case when dealing with $D_2O$ used in reactors or in the previously discussed $D_2O$ production process. Typically, the ratio of tritium concentrations between input and output streams of a regenerator 20 in a light water detritiation system will be of the order of 1000, whereas in a heavy water detritiation process or a heavy water production process, the isotopic ratio across the regenerator 20 will be of the order of 10.

The high isotopic ratio across the regenerator 20 in a light water detritiation process requires that the countercurrent flows of steam and exchange liquid be at unequal rates so that the column will be of a reasonable size. Calculations indicate that the number of theoretical plates required for a regenerator 20 wherein the countercurrent flows are about equal is more than 1000. However, the number of plates drops quickly as the downward flow is increased relative to the upward flow of steam. Thus, when the rate of liquid flowing down the column is 1.5 times the upward flow rate of steam, the required number of theoretical plates is reduced to 17, which is commercially reasonable.

Figure 3:
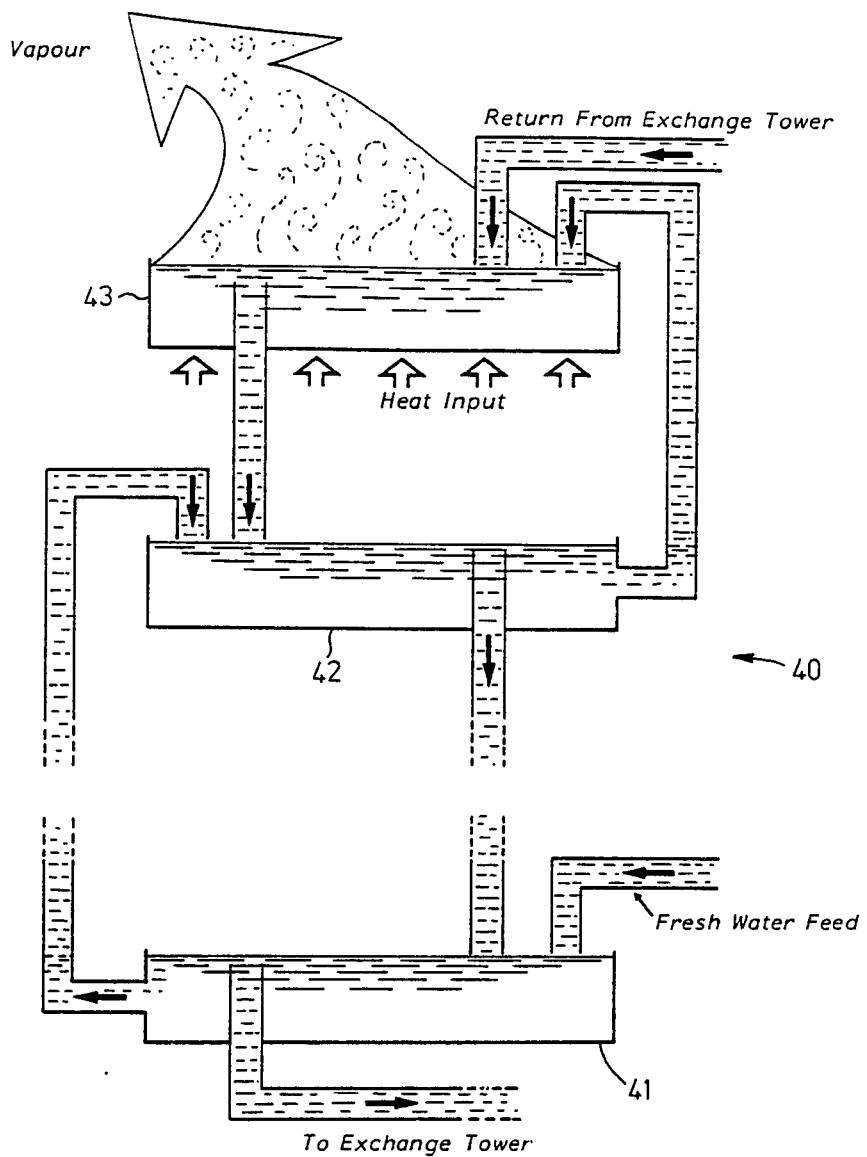
FIG. 3 is a schematic diagram of an exchange liquid regenerator for the tritium removal process of the invention.

In either the $D_2O$ production or the tritium removal processes, the gas/liquid regenerator 20 may be replaced by a liquid/liquid contacting column 40 or apparatus as is shown in FIG. 3. It should be appreciated that because the apparatus of FIG. 3 handles the countercurrent flows of two liquids, the apparatus can be arranged horizontally as well as vertically. Clearly, there may be cost advantages favoring the horizontal arrangement.

Referring to FIG. 3, which shows the regenerator 40 as a column, depleted exchange liquid from the bottom of the exchange tower 25 is introduced into the top of the column 40, and feed water containing an enriched concentration of either deuterium or tritium is introduced at the bottom of the column 40. The two streams move countercurrently through a number of mixing stages within the column 40 which provide the required theoretical stages to achieve replenishment of the exchange liquid. Each stage of the regenerator 40 is identical except for the first and last stages. From FIG. 3 these stages can be shown as mixing vessels or trays 41, 42 and 43. Each mixing tray 42 receives liquid from both above and below, the liquids are mixed and then divided into flows going up and down the column 40. The top tray 43 receives a flow from the exchange column 25 and a flow of steam or gaseous $D_2O$ is removed therefrom. The bottom tray 41 receives a flow of feed water or $D_2O$, and the downward flow therefrom comprises regenerated exchange liquid which goes to the top of the exchange tower 25. It should be appreciated that because steam is being removed from the top tray 42, the concentration of base catalyst, e.g. NaOH, being introduced into the column 40 as a component of the exchange liquid, will gradually increase toward the top of the column 40. This increase in concentration is also true for DMSO, but is not as critical to the operation of the regenerator 40 since DMSO is a liquid. The increase in NaOH concentration toward the top of the column 40 is a consequence of the fact that the NaOH has a flow rate up the column 40 which is dependent on the upward flow rate of water in the column 40 and the NaOH concentration in that water. Whereas in the steam/liquid regenerator 20 the flow rate of NaOH up the column is dependent on its vapor pressure, and thus, for practical purposes is nil. This increased concentration of NaOH in the liquid/liquid regenerator 40 can be moderated by adjusting the flow rates of the liquids moving countercurrently. By increasing the flow rate of liquid down the column 40 as compared to liquid moving up the column 40, the factor of increase in the concentration of NaOH at the top of the column 40 is reduced.

It has been calculated that for a tritium removal plant wherein the $H_2O$ feed stream has a tritium concentration of 50 Ci/l and the $H_2O$ output stream has a tritium concentration of 0.05 Ci/l, a regenerator 40 having eleven theoretical stages and a flow down the column 40 twice that of the flow up the column 40, the NaOH concentration in the top tray 43 is twice that of the NaOH concentration in the exchange liquid entering the top of the column 40. These parameters are reasonable for a tritium removal process, however, as the flows in the column 40 approach unity, the concentration of NaOH in the top tray 42 increases rapidly and salting out of the NaOH becomes an overriding problem. Thus, while both the gas/liquid and liquid/liquid regenerators 20 and 40 work on similar principles, the choice of the type of regenerator to use in a process of the type described herein will depend on a number of design parameters.

We claim:

1. A method for deuterium or tritium isotope replenishment of an exchange liquid in a process for concentrating deuterium or tritium by means of a laser induced selective photodissociation of a deuterium or tritium containing working compound mixed with its protiated or deuterated analog, said working compound being selected from the group consisting of a dueterated or tritiated analog of a dihalomethane, a trihalomethane, a 1,2-dihaloethylene, a trihaloethylene, a tetrahaloethane, and a pentahaloethane, comprising the steps of:

selectively laser photodissociating the working compound to give an isotope enriched compound and an isotope depleted working compound;

contacting the isotope depleted working compound mixture countercurrently with an exchange liquid having approximately the isotope concentration of an external source feed stream of water or $D_2O$ in a first contacting column, said countercurrent contacting providing an isotope replenishment of the working compound as it moves up the column and an isotope depletion of the exchange liquid as it moves down the column, the exchange liquid consisting essentially of a mixture of water or $D_2O$ and a strong base catalyst;

removing isotope deplated exchange liquid from the bottom of the first column;

contacting the isotope depleted exchange liquid countercurrently with the feed stream in a second contacting apparatus thereby providing isotope replenishment of the exchange liquid and isotope depletion of the feed stream without causing salting out of the base catalyst; and removing the isotope replenished exchange liquid from one end of the second apparatus for use in the first column and removing isotope depleted water or $D_2O$ steam from the other end of the second apparatus.

2. The method as claimed in claim 1, wherein the base catalyst is present in the exchange liquid in a concentration of 0.01 to 0.1 mole/liter.

3. The method as claimed in claim 2, wherein the base catalyst is sodium hydroxide.

4. The method as claimed in claim 1, wherein the working compound is deuterated trifluoromethane.

5. The method as claimed in claim 1, wherein the working compound is tritiated trichloromethane.

6. The method as claimed in claim 1, wherein the working compound is tritiated trifluoromethane.

7. The method as claimed in claim 1, wherein the exchange liquid consists essentially of water, dimethylsulfoxide, and a strong base catalyst, the feed stream is water steam having a natural abundance of deuterium, and deuterium depleted water steam is removed from said other end of the second apparatus.

8. The method as claimed in claim 7, wherein the countercurrent flow rates of exchange liquid and feed steam within the second contacting apparatus are approximately equal.

9. The method as claimed in claim 1, wherein the exchange liquid consists essentially of $D_2O$, and a strong base catalyst, the feed stream is tritium contaminated liquid $D_2O$, and tritium depleted $D_2O$ steam is removed from said other end of the second apparatus.

10. The method as claimed in claim 9, wherein the countercurrent flow rates of exchange liquid and feed liquid $D_2O$ within the second contacting apparatus are unequal.

11. The method as claimed in claim 1, wherein the exchange liquid consists essentially of water, and a strong base catalyst, the feed stream is tritium contaminated liquid water, and tritium depleted water steam is removed from said other end of the second apparatus.

12. The method as claimed in claim 7, further comprising recovering absorbed dimethylsulfoxide from the removed water steam.

13. The method as claimed in claim 11, wherein the countercurrent flow rates of exchange liquid and feed liquid water within the second contacting apparatus are unequal.

14. The method as claimed in claim 10, wherein the flow rate of exchange liquid is approximately twice that of feed liquid $D_2O$ within the second contacting apparatus.

15. The method as claimed in claim 13, wherein the flow rate of exchange liquid is approximately twice that of feed liquid water within the second contacting apparatus.

16. The method as claimed in claim 1, wherein the exchange liquid consists essentially of a mixture of water or $D_2O$, dimethylsulfoxide, and a strong base catalyst.

17. The method as claimed in claim 16, wherein the mixture of water or $D_2O$ and dimethylsulfoxide comprising the exchange liquid is from 50 to 90 mole percent dimethylsulfoxide.

* * * * *